March 23, 1937.  A. C. STARR  2,074,709

BRAKE

Filed March 21, 1923  2 Sheets-Sheet 1

INVENTOR
Albert Cooper Starr
BY
M. W. McConkey
ATTORNEY

March 23, 1937.  A. C. STARR  2,074,709
BRAKE
Filed March 21, 1923   2 Sheets-Sheet 2
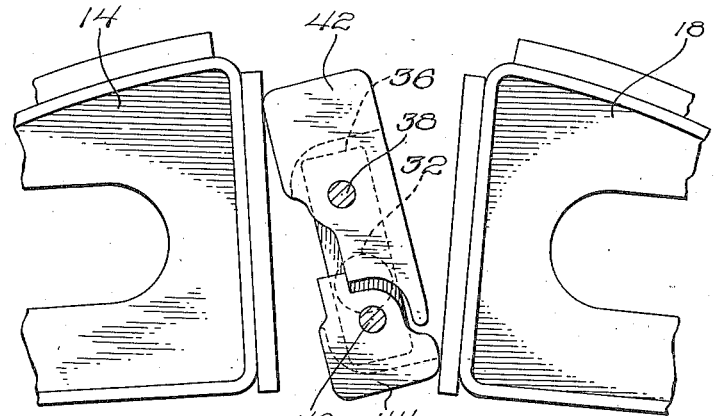
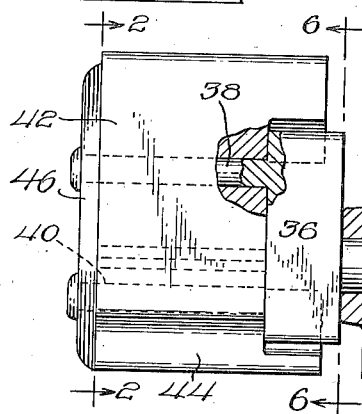
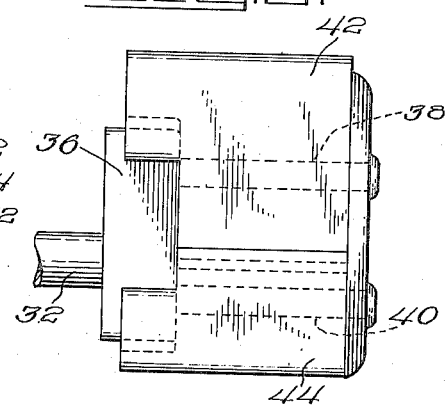
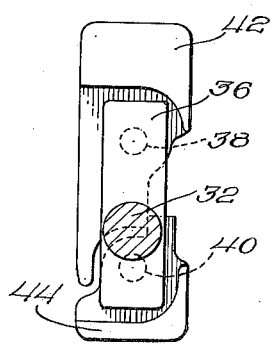
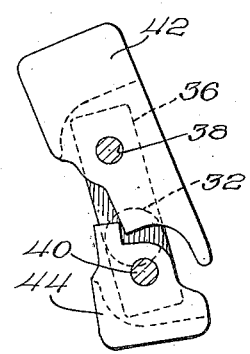
INVENTOR
Albert Cooper Starr
BY
ATTORNEY Patented Mar. 23, 1937

2,074,709

UNITED STATES PATENT OFFICE 2,074,709

BRAKE

Albert Cooper Starr, Nephi, Utah, assignor to Bendix Brake Company, South Bend, Ind., a corporation of Illinois Application March 21, 1928, Serial No. 263,244

17 Claims. (Cl. 188—78)

This invention relates to brakes, and is illustrated as embodied in a novel applying device for an internal expanding automobile brake. An object of the invention is to provide a simple and inexpensive applying device which will balance the forces acting on the respective shoes or their equivalents, and preferably in a manner permitting the device to be operated by means such as a shaft journaled in a fixed bracket. I prefer also to construct the device in a manner permitting any desired distribution of the thrusts on the shoes or the like, without interfering with the balancing of the thrusts.

In one desirable arrangement, the device includes a head or the like, turned by the shaft to apply the brake, and on which two novel interengaging thrust members or cams are independently pivoted, preferably on opposite sides of the shaft axis. By varying the distances from the shaft axis to the respective pivotal axes of these thrust members, the "throw" or movement of these members may be varied independently of each other, while by varying the distances from the pivotal axes to the point of interengagement the distribution of the thrusts may be varied to give any desired ratio. Thus it becomes feasible to give the greatest leverage or thrust to the cam having the greatest movement, a desirable object not heretofore readily attainable.

The above and other objects and features of the invention, including various novel and desirable details of construction, will be apparent from the following description of one illustrative embodiment shown in the accompanying drawings, in which:

Figure 3 is a view corresponding to Figure 2, but showing the brake applied;

Figure 4 is a vertical section longitudinally of the applying device, but with the thrust members or cams shown in elevation;

Figure 5 is an elevation of the opposite side of the applying device;

Figure 6 is a section on the line 6—6 of Figure 4, showing the device in rear elevation;

Figure 7 is a view corresponding to part of Figure 3, but showing the shifting of the cam or thrust parts to compensate for unequal wear while still balancing the thrusts; and Figure 8 is a view corresponding to part of Figure 3, but showing a modification.

Figure 1:
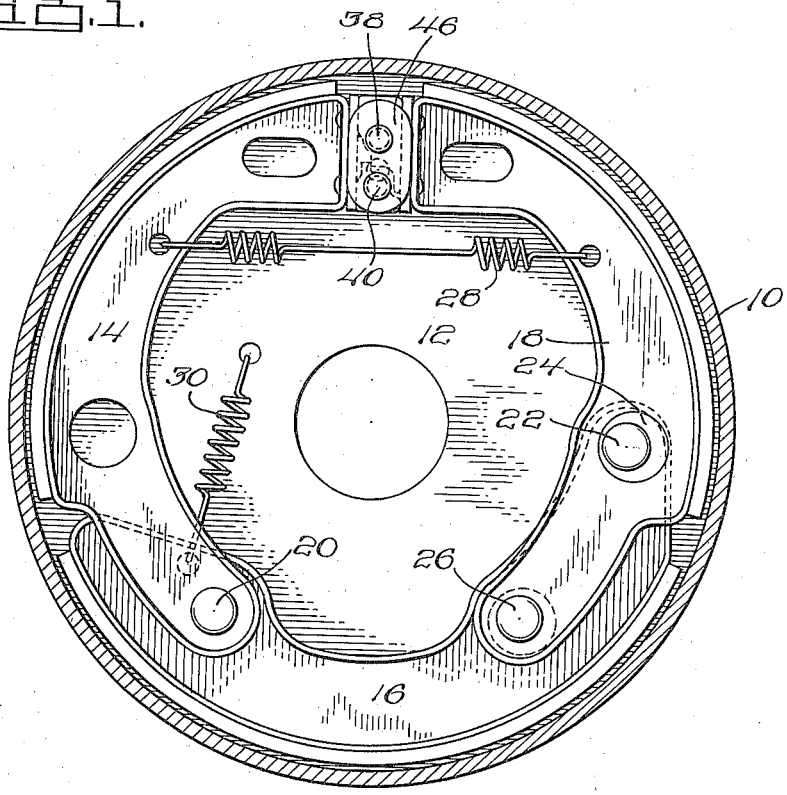
Figure 1 is a vertical section through the brake, just inside the head of the brake drum, and showing the brake shoes in side elevation.
Figure 2:
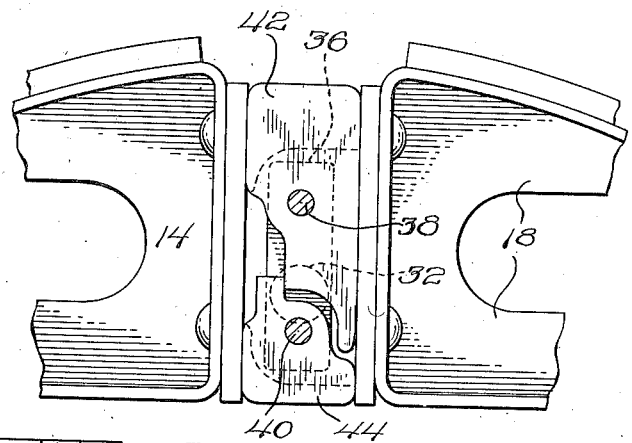
Figure 2 is a view, on a larger scale than Figure 1, and with the shoe-confining stamping removed from the end of the novel applying device (i. e. on the line 2—2 of Figure 4), and showing the applying device and the adjacent ends of the brake shoes.

The illustrated brake is of the internal expanding three-shoe type, and being well known to those skilled in the art is not herein fully described. A complete description of this particular brake, in which my invention may be embodied if desired, is given in Patent No. 1,567,716, granted Bendix Brake Company December 29, 1925, on application of A. Y. Dodge. This brake includes a rotatable drum 10, at the open side of which is a support such as a backing plate 12, and within which are the three shoes 14, 16, and 18 forming the friction means of the brake.

Shoes 14 and 18 may be interchangeable with each other, and are forked at their lower ends to straddle opposite ends of shoe 16. Shoe 14, ordinarily known as the "primary" shoe, is connected to the "secondary" shoe 16 by a floating pivot 20, or an equivalent articulating joint, shoe 16 being anchored on a fixed pivot 22 carried by the backing plate 12. Anchor pivot 22 passes through a relatively large opening 24 in "auxiliary" shoe 18, so that it does not interfere with the movement of that shoe. Shoe 18 is anchored on a pivot 26 also carried by the backing plate 12, and which passes through a relatively large opening shown in dotted lines in shoe 16.

The brake is applied by forcing the primary and auxiliary shoes 14 and 18 apart against the resistance of a return spring 28, whereupon primary shoe 14 applies the secondary shoe 16 against the resistance of an auxiliary return spring 30. The present invention relates to the applying means for forcing apart the adjacent ends of shoes 14 and 18, or the corresponding parts of brakes of other types.

In the embodiment of the invention herein illustrated, and which is especially adapted for use in the illustrated three-shoe brake, there is a novel balancing thrust device acting on the shoe ends and operated by a rotatable but non-shiftable shaft 32 journaled in a fixed bearing or bracket 34 riveted or otherwise non-shiftably secured to the backing plate 12.

Shaft 32 is formed with a cross-head 36, which may be forged integrally with the shaft if desired, and which has two pivot extensions 38 and 40 integral with or secured to the cross-head. Since in this particular brake the primary shoe 14 has to move far enough in applying the brake to take up not only its own clearance but also the clearance of shoe 16, whereas shoe 18 only has to move far enough to take up its own clearance, and since therefore shoe 14 must move approximately twice as far as shoe 18, the axis of pivot 38 is approximately twice as far from the axis of shaft 32 as is the axis of pivot 40.

Mounted on pivots 38 and 40 are novel thrust parts or cams 42 and 44, respectively acting on shoes 14 and 18 in applying the brake. A plate or stamping 46 beyond these thrust parts, and held if desired by riveting over pivots 38 and 40, projects beyond the thrust parts to engage the sides of the shoes 14 and 18 to confine them laterally.

Thrust parts 42 and 44 can turn freely on their pivots, and in order to balance the forces they exert on the shoes 14 and 18 they have portions in interengagement with each other between the pivots 38 and 40. As the points of engagement with shoes 14 and 18 are outside of pivots 38 and 40, the thrust parts 42 and 44 form in effect a system of balanced levers acting on the shoes.

Since the distance 40—32 is approximately one-half the distance 32—38, unless some provision is made to the contrary, the leverage on shoe 18 will be approximately double the leverage on shoe 14, and therefore the force applied to shoe 18 will be approximately twice the force applied to shoe 14. I prefer, however, to arrange the parts so that the forces on the two shoes will be approximately equal, or so that somewhat greater force will be applied to shoe 14 than to shoe 18.

To this end the distance from the axis of pivot 40 to the point of engagement between parts 42 and 44 is half or less than half the distance from this point of engagement to the axis of pivot 38. That is, by varying the ratio of distance 40—32 to distance 32—38 the relative "throw" or movement of the two thrust parts may be varied as desired. This involves a corresponding variation in the leverages, but this can be compensated for, and any other desired variation in leverages can be introduced, by varying the effective leverages of parts 42 and 44 on each other.

While one illustrative embodiment has been described in detail, it is not my intention to limit the scope of the invention to that particular embodiment, or otherwise than by the terms of the appended claims.

I claim:

1. A brake cam device comprising, in combination, a shaft, a head turned by said shaft, and a pair of interengaging thrust members independently eccentrically pivoted on said head at different distances from the shaft axis.

2. A brake cam device comprising, in combination, a shaft, a head turned by said shaft, and a pair of interengaging thrust members independently eccentrically pivoted on said head, the distances from the point of interengagement of said members to their respective pivotal axes being different.

3. A brake cam device comprising, in combination, a shaft, a head turned by said shaft, and a pair of interengaging thrust members independently eccentrically pivoted on said head at different distances from the shaft axis, the distances from the point of interengagement of said members to their respective pivotal axes being different.

4. A brake cam device comprising, in combination, a shaft, a head turned by said shaft, and a pair of interengaging thrust members independently pivoted on said head at different distances from the shaft axis, the distances from the point of interengagement of said members to their respective pivotal axes being different and being inversely proportional to the distances from said pivotal axes to the shaft axis.

5. A brake cam device constructed and arranged to be mounted within a brake and comprising, in combination, an angularly-movable head having pivots on opposite sides of its axis, and thrust members mounted on said pivots and having interengaging portions between the pivots and having their outer ends arranged for operative engagement with the brake friction means.

6. A brake cam device constructed and arranged to be mounted within a brake and comprising, in combination, an angularly-movable head having pivots on opposite sides of its axis, and members mounted on said pivots and having interengaging portions between the pivots and having thrust portions outside of the pivots arranged for operative engagement with the brake friction means.

7. A brake cam device comprising, in combination, an angularly-movable head having pivots on opposite sides of its axis, and thrust members mounted on said pivots and having interengaging portions between the pivots, together with a plate carried by the ends of the pivots opposite said head.

8. A brake cam device comprising, in combination, an angularly-movable head having pivots on opposite sides of its axis, and thrust members mounted on said pivots and having interengaging portions between the pivots, together with a plate carried by the ends of the pivots opposite said head and projecting beyond the thrust members to engage the sides of brake shoes operatively engaged at their ends by the thrust members.

9. A brake comprising, in combination, friction means having ends movable different distances in applying the brake, and floating applying means acting on said ends, said floating means including independently-movable parts balanced against each other and engaging said ends respectively and which normally move different distances in applying the brake to correspond to the movements of said ends.

10. An expanding device for an internal expanding brake comprising a member rotatable about a fixed axis and a pair of parts eccentrically pivotally mounted on said member and connected to interact with each other, each of said parts engaging one end of the friction device whereby rotation of said member spreads the ends of the device from each other.

11. The combination of brake friction means having relatively movable ends, an anchorage for said means, and means for moving said ends including a member rotatable about a fixed axis and having a pair of arms pivotally mounted about axes spaced from said fixed axis, said arms being connected whereby pivotal movement of one arm relative to said member causes an opposed movement of the other and moves at least one of said ends.

12. The combination of brake friction means having movable ends, anchorage means therefor, and means for spreading said ends apart including a member rotatable about a fixed axis extending parallel to said anchorage means and having a pair of arms pivotally mounted about axes spaced from said fixed axis, said arms being in interengagement whereby a pivotal movement of one relative to said member causes an opposed movement of the other.

13. The combination of brake friction means having movable ends, anchorage means therefor, and means for forcing said ends into engagement with a brake drum including a rotatable member and a pair of arms eccentrically pivotally mounted on said member, each of said arms engaging one of said ends and said arms engaging each other whereby rotation of said member causes said arms to exert opposed forces on said ends.

14. An expanding device for a brake including a rotatable shaft, a head for the shaft, arms pivotally mounted on said head at spaced points, said arms having parts in engagement with each other between said spaced points, said arms extending generally in alignment with each other and in opposite directions from said points of pivotal mounting and adapted to engage the friction means of the brake adjacent its ends whereby rotation of said shaft causes the arms to exert a balanced spreading force on said ends.

15. A brake applying device comprising, in combination, an angularly movable operating member having spaced portions connected by pivots, and thrust members arranged between the spaced portions and mounted on said pivots and which are balanced against each other.

16. A brake applying device comprising, in combination, a shaft having at its end two cross members connected by pivots, and thrust members mounted respectively on said pivots between the cross members and in balancing engagement with each other.

17. A brake applying device comprising, in combination, a shaft having at its end two cross members connected by pivots, and thrust members mounted respectively on said pivots between the cross members and in balancing engagement with each other, said cross members extending beyond the thrust members to embrace the sides of brake shoes between the ends of which the thrust members are arranged.

ALBERT COOPER STARR.